United States Patent Office 3,513,120
Patented May 19, 1970

3,513,120
PRODUCTION OF DISPERSIONS OF POLYMERS OF STYRENE AND ESTERS OF ACRYLIC OR METHACRYLIC ACID
Heinz Pohlemann, Limburgerhof, Pfalz, Gerhard Florus, Ludwigshafen (Rhine), Wolfgang Sliwka, Weinheim, Bergstrasse, and Manfred Gellrich, Gruenstadt, Germany, assignors to Badische Anilin- & Soda-Fabrik Aktiengesellschaft, Ludwigshafen (Rhine), Rhineland-Pfalz, Germany
No Drawing. Filed Oct. 10, 1966, Ser. No. 585,293
Claims priority, application Germany, Oct. 29, 1965, 1,570,312
Int. Cl. C08f 1/13, 19/10
U.S. Cl. 260—29.6        11 Claims

ABSTRACT OF THE DISCLOSURE

Process of copolymerizing styrene and acrylic esters in aqueous emulsion and adding a small amount of a protective colloid gradually during the polymerization so as to obtain highly viscous aqueous dispersions of copolymers of styrene and acrylic esters having a large particle size. The products are useful in films, coatings and adhesives.

It is known that aqueous dispersions of copolymers of styrene and acrylic esters may be used for painting and other coating purposes. It is a disadvantage of these known dispersions, which in general have been prepared by polymerization in aqueous dispersion in the presence of soaps, that they are usually mobile liquids and often have little stability and it is therefore necessary to add relatively large amounts of thickeners or stabilizers prior to their use for painting and the like. Adding thickeners and stabilizers to prior art dispersions of copolymers of styrene and acrylic esters not only involves a second operation, but the water absorption of the coating is increased and its resistance to washing is impaired by the content of thickeners and stabilizers in the dispersion.

It is also known that dispersions of copolymers of styrene and acrylic esters which contain carboxyl groups in the copolymer may be prepared in the presence of soaps, and that higher viscosities are thus obtained in the alkaline range. Paints prepared therewith are unsatisfactory in their fluidity and flow and coatings prepared therewith have a lower hiding power than those prepared from paints containing binders which constitute coarser or mixed-particle-size dispersions. If an attempt be made to prepare relatively coarse-particled viscous styrene-acrylic ester copolymer dispersions in the way known for example for the polymerization of vinyl esters by carrying out the polymerization in the presence of protective colloids, usually coagulation takes place or dispersions are obtained which form sand-grained films and are therefore unsuitable for use as paints.

It is also known from British patent specification No. 856,337 that in the production of butadiene polymer latices a polyvinyl alcohol of polyvinyl methyl ether may be added after conversion of 60 to 95% of the monomers so that the latex particles become coarser. This effect is however accompanied by a decrease in the viscosity of the latex.

It is the object of the present invention to provide a process for the production of stable relatively coarse-particled aqueous dispersions of copolymers of styrene with acrylic esters and/or methacrylic esters which can be used for painting. Another object of the invention is to provide a process for the production of stable relatively coarse-particled aqueous dispersions of copolymers of styrene with acrylic esters and/or methacrylic esters which have a higher viscosity than fine-particled dispersions prepared in a comparable way. Other objects of the invention will be apparent to the expert from the following description.

We have found that polymer dispersions can be prepared in aqueous medium in the presence of catalysts and emulsifiers by polymerization of styrene and esters of acrylic and/or methacrylic acid with alcohols which contain one to eight carbon atoms in the alcohol radical, by gradually adding during the polymerization after about 20 to 80% conversion of the monomers has taken place, a small amount of a protective colloid and completing polymerization. The dispersions obtained are stable and relatively highly viscous and the polymer particles contained therein are relatively large.

The process according to this invention is suitable for copolymers of styrene with esters of acrylic acid and/or methacrylic acid. Preferred esters of acrylic acid and/or methacrylic acid are those which contain one to eight carbon atoms in the alcohol radical, such as linear and branched alkanols containing one to eight carbon atoms and cycloalkanols having five to eight ring carbon atoms.

Ethyl acrylate, butyl acrylate and 2-ethylhexyl acrylate are particularly suitable. The following are further examples of suitable esters: esters of acrylic acid and methacrylic acid with methanol, n-propanol, isopropanol, isobutanol, tertiary-butanol, n-hexanol and cyclohexanol. It is preferred to use acrylic esters of alkanols containing one to four carbon atoms. The type of acrylic or methacrylic ester used depends on the purpose for which the dispersions are to be used and on the desired hardness of the coatings prepared by means of the dispersions. The purpose of use and the desired film hardness also determine the amount of acrylic ester and/or methacrylic ester to be incorporated in the copolymer, this amount being from 5 to 95%, advantageously 35 to 90%, by weight depending on the type of acrylic or methacrylic ester. The proportion of styrene in the copolymer is usually more than about 5%, advantageously more than about 10%, particularly from 10 to 65%, by weight in order that the dispersions may be coarse-particled, stable and highly viscous. It may be up to 95%. If the styrene content be more than 65%, it is usually necessary to add an external plasticizing agent in order to obtain a smooth film at room temperautre. Copolymer dispersions which have been prepared according to this invention from about 40 to about 60% by weight of styrene and about 40 to about 60% by weight of butyl acrylate have proved to be very suitable. It may be of advantage for minor proportions of polar monomers, for example ethylenically unsaturated monocarboxylic acids or diccarboxylic acids or their amides containing three to five carbon atoms, such as acrylic acid, methacrylic acid, itaconic acid, maleic acid, and particularly acrylamide and methacrylamide or vinylsulfonic acid, to be used in the production of the copolymers. Thus by incorporating 0.05 to 5% by weight of units of an ethylenically unsaturated carboxylic acid, such as acrylic acid or vinylsulfonic acid, into the copolymer of styrene and acrylic ester and/or methacrylic ester, the adherence and pigment compatibility of the copolymer dispersions prepared according to this invention may be still further enhanced. The percentages by weight given herein relate to the total weight of monomers.

Particularly suitable emulsifiers (which are used in conventional amounts) for the process are the conventional anion-active emulsifiers and particularly combinations of anion-active emulsifiers with nonionic emulsifiers. Combinations of sulfonated adducts of alkylphenols, fatty alcohols or amines and ethylene oxide with about five to fifty ethenoxy groups in the molecule with nonionic ethylene oxide adducts have proved to be particularly suitable. The emulsifiers may be added before or preferably partly during the polymerization together with the monomer mixture as an emulsion feed to the polymerization mixture.

Radical-forming substances conventionally used in dispersion polymerization, for example potassium persulfate or hydrogen peroxide, may be used as polymerization catalysts, in the conventional amounts, with or without activators. The polymerization temperature depends on the type of catalyst system used and in the preferred embodiment of the process is about 60° to about 100° C.

Particularly suitable protective colloids, which according to the invention are added to the polymerization mixture gradually as conversion proceeds, are polyvinyl alcohols and cellulose derivatives and of these particularly hydroxyethyl cellulose; other protective colloids are polymers of acrylic acid and/or methacrylic acid and/or acrylamide and/or methacrylamide and/or water-soluble copolymers of one or more of these monomers with for example vinyl pyrrolidone, vinyl esters, such as vinyl acetate, acrylic esters, such as methyl acrylate, or acrylonitrile. Modified polyvinyl alcohols are preferred as polyvinyl alcohols. The use in the copolymers of water-soluble partially saponified polyvinyl esters or partially acetalized polyvinyl alcohols, which in addition to the vinyl alcohol units also contain hydrophobic radicals in minor amounts, is also advantageous. The amount of protective colloid added is in general about 0.01 to about 2%, and particularly 0.1 to 0.5%, by weight on the amount of monomers. It has been found that when using high molecular weight protective colloids, the addition of a smaller amount is sufficient, and the addition of the protective colloid may take place at a later point in the polymerization than when using protective colloids of lower molecular weight. Polyvinyl alcohols having a K value of more than about 70, hydroxyethyl celluloses having K values of more than 130 and acrylic acid polymers or copolymers having K values of more than 100 are regarded as being of high molecular weight in this context. The K values of the protective colloids are in general from 20 to 200.

Addition of the protective colloids to the polymerization mixture should be made according to the invention gradually after the conversion of about 20 to about 80% of all the monomers to be polymerized and particularly after about 40 to about 80% conversion. Early addition of much protective colloid and particularly of high molecular weight protective colloid causes a marked increase in the viscosity, but in some cases may have a disadvantageous effect on the fluidity of the dispersions and the clarity of film and brushability of the paint. It has been found however that in the presence of 0.05 to 1% of polyvinyl methyl ether in the polymerization mixture, smooth, easily flowing dispersions which yield a clear glossy film are obtained even with high molecular weight protective colloids. Very late addition of an equal amount of protective colloid or adding it after complete polymerization has less effect or practically no effect on the viscosity and stability of the dispersions. The suitable time at which to make the addition within the range in accordance with this invention may be readily determined for a particular system by a small-scale experiment having regard to the desired properties of the dispersions. We have found that in the production of copolymers of styrene with acrylic esters or methacrylic esters using polar monomers, such as acrylic acid or acrylamide, relatively early addition of the protective colloid is advantageous, addition after a conversion of about 20 to about 60% of the monomers and especially about 20 to about 40% has proved to be particularly advantageous. In the polymerization of styrene and acrylic esters or methacrylic esters without using polar monomers, however, it has proved to be advantageous not to add the protective colloid until after an about 40% conversion of the monomers. Addition should be effected gradually according to this invention. In the preferred embodiment of the polymerization process, in which the monomers are added with part of the emulsifier solution as the polymerization proceeds, the addition is made with the addition of the remainder of the monomer emulsion. Separate gradual addition, which if possible should extend over the whole remaining polymerization period, is also possible. The polymerization mixture is in general kept at the polymerization temperature, preferably at 60° to 100° C., during the addition of the protective colloid and polymerization is carried to completion at this temperature.

Polymer dispersions prepared according to this invention are particularly suitable for painting and the like, but may also be used for example as adhesives, for coating paper or for improving cement. The dispersions have a high pigment binding power and outstanding compatibility with a great variety of pigments, their compatibility with kaolin and chalk being worthy of particular mention. Their compatibility with casein (which is often used as an additional binder, especially for gloss paints) and their particularly good processability are also of advantage. Films prepared from the dispersions satisfy even stringent requirements in practice and exhibit low water absorption. The dispersions differ from subsequently thickened fine-particled dispersions of copolymers having about the same composition by having a far better flow behavior and by imparting better hiding power to paints prepared therefrom. They have the considerable advantage over dispersions of polymers containing many carboxyl groups that their desirable high viscosity is not dependent on the pH value. As compared with fine-particled dispersions which have been prepared without the addition of protective colloid at about 20 to about 80% conversion or prepared with monomer mixtures free from styrene, but otherwise having the same composition, they have a much higher stability, for example on stirring or incorporating pigments.

The invention is illustrated by the following examples. The parts and percentages specified are by weight. The K values given have been determined by the method of H. Fikentscher, "Cellulose-chemie" 13 (1932) 58, and the viscosity of the dispersions has been measured in the Epprecht rheometer with rotor C in stage III.

EXAMPLE 1

A reactor provided with a reflux condenser, stirrer and two feed vessels is charged with one third of the following emulsifying liquor: 470 parts of water, 12.5 parts of the sodium salt of the sulfonation product of nonylphenol reacted with 9 moles of ethylene oxide, 7.5 parts of an adduct of 25 moles of ethylene oxide and 1 mole of n-octylphenol, and 1.25 parts of sodium vinylsulfonate. The reactor is purged with nitrogen and heated to 80° C. A mixture of 250 parts of styrene, 250 parts of n-butyl acrylate and 1 part of methyl vinyl carbinol is emulsified in the remainder of the liquor. This emulsion is allowed to flow uniformly from one feed vessel into the reactor within ninety minutes while stirring. At the same time a solution of 2.5 parts of potassium persulfate in 50 parts of water is allowed to flow in from the other feed vessel. The reaction temperature is kept at 80° to 85° C. 12.5 parts of a 10% aqueous solution of a polyvinyl alcohol having a K value of 55 which has been acetalized with 4% of n-butyraldehyde and completely hydrolyzed is added to the final 100 parts of the monomer emulsion being fed in. At the commencement of the addition of the protective colloid, the polymerization conversion is about 50%. When all has been fed in, polymerization is completed within two hours at 85° to 90° C. A dispersion is obtained which is free from coagulate and stable to stirring, which flows well and dries to a clear, glossy, non-tacky film. The viscosity is 8 poises. The dispersion consists of primary particles having a size of 0.1 to 0.3 micron, substantially agglomerated to particles a few microns in size.

The dispersion is particularly suitable as an all-purpose binder for paints with easy brushability and good flow.

It permits the production of both low-pigmented paints with excellent gloss and (owing to the good pigment binding power) highly pigmented matt paints. It has good compatibility with conventional pigments and fillers, particularly with kaolin and a great variety of grades of chalk. The good flow is retained when the dispersion is mixed with binders containing casein.

Comparative experiment A

The procedure of Example 1 is followed but the polyvinyl alcohol is added only after the batch has polymerized completely. A mobile polymer dispersion containing coagulate is obtained whose viscosity is only 0.5 poise, and further coagulate easily forms upon stirring or upon incorporation of pigments. The particle size is 0.2 micron.

Comparative experiment B

The procedure of Example 1 is followed but the polyvinyl alcohol is added to the feed when 500 parts or more of the monomer emulsion remains in the feed vessel, i.e. at a conversion of 15% or less. The batch coagulates.

EXAMPLE 2

One third of an emulsifying liquor of 460 parts of water, 12.5 parts of the sodium salt of the sulfonation product of a nonylphenol reacted with 9 moles of ethylene oxide and 7.5 parts of an adduct of 25 moles of ethylene oxide and 1 mole of n-octylphenol is placed in a reactor provided with a stirrer, reflux condenser and two feed vessels. 2.5 parts of acrylic acid is added and the pH value is adjusted to 9 with concentrated ammonia. The reactor is purged with nitrogen and heated to 80° C. 1 part of methacrylamide is dissolved in the remaining emulsifying liquor and a mixture of 250 parts of styrene, 250 parts of n-butyl acrylate and 1.0 part of methyl vinyl carbinol is emulsified in. At 80° to 85° C., this emulsion is introduced uniformly into the reactor simultaneously with a solution of 2.5 parts of potassium persulfate in 50 parts of water in the course of ninety minutes while stirring. The final 135 parts of the feed of emulsion is mixed with 25 parts of a 5% aqueous solution of a hydroxyethyl cellulose having a K value of 90. Polymerization is completed within two hours at 85° to 90° C. The dispersion has a viscosity of 4 poises and an even better compatibility with pigments and with casein than the dispersion according to Example 1, the other properties being the same.

If the solution of the hydroxyethyl cellulose is added in the final 600 parts of the monomer emulsion, i.e. at a convension of 25%, a dispersion having a viscosity of 25 poises is obtained.

EXAMPLE 3

The procedure of Example 1 is followed but 17.5 parts of a 5% aqueous solution of a hydroxyethyl cellulose having a K value of 140 is used instead of polyvinyl alcohol as the protective colloid. The viscosity of the polymer dispersion obtained is 8 poises.

EXAMPLE 4

The procedure of Example 2 is followed but 25 parts of a 5% aqueous solution of polyacrylic acid having a K value of 65 which has been adjusted to a pH value of 6 with concentrated ammonia is used instead of hydroxyethyl cellulose as the protective colloid. The polymer dispersion obtained has a viscosity of 3 poises It has particularly good compatibilty with pigments containing kaolin and yields a high-gloss film.

EXAMPLE 5

180 parts of the following emulsifying liquor is placed in a reactor provided with a reflux condenser, stirrer and two feed vessels: 470 parts of water, 12.5 parts of the sodium salt of the sulfonation product of a nonylphenol which has been reacted with 9 moles of ethylene oxide, 7.5 parts of an adduct of 25 moles of ethylene oxide to 1 mole of p-octylphenol and 2.5 parts of an adduct of 34 moles of propylene oxide and 31 moles of ethylene oxide. 2.5 parts of acrylic acid and 1 part of polyvinyl methyl ether is added and the pH value is brought to 9 with concentrated ammonia. The reactor is purged with nitrogen and heated to 80° C. A mixture of 250 parts of styrene, 250 parts of n-butyl acrylate and 1.0 part of methyl vinyl carbinol is emulsified in the remaining liquor. This emulsion is introduced uniformly into the reactor from one feed vessel within two hours while stirring. At the same time the catalyst solution (consisting of 2.5 parts of potassium persulfate in 50 parts of water) flows in from the other feed vessel. The reaction temperature is kept at 80° to 85° C. 20.8 parts of a 6% aqueous solution of a copolymer (consisting of 50% of acrylic acid, 50% of acrylamide, 10% of acrylonitrile and 10% of methyl acrylate) is added to the final 130 parts of the emulsion feed which is brouhgt to pH 6 with ammonia. The K value of the neutralized copolymer is 170. After all the components have been added the polymerization is completed within two hours at 85° C.

A polymer dispersion is obtained which is free from coagulate, flows well and has a viscosty of 7 poises. It yields a clear glossy film and has very good compatibility with kaolin and chalk.

EXAMPLE 6

The procedure of Example 2 is followed but a monomer mixture of 300 parts of styrene and 200 parts of 2-ethylhexyl acrylate is used instead of 250 parts of styrene and 250 parts of n-butyl acrylate. The medium-viscosity polymer dispersion obtained gives a particularly hard, tough film.

From a mixture of 350 parts of styrene and 150 parts of 2-ethylhexyl acrylate by the same process there is also obtained a polymer dispersion which is free from coagulate and smooth and which has about the same viscosity but which does not yield transparent films at room temperature without the addition of an external plasticizer.

EXAMPLE 7

The procedure of Example 2 is followed but a mixture of 50 parts of styrene, 200 parts of n-butyl acrylate and 250 parts of tertiary-butyl acrylate is used as the monomers. The resultant stable polymer dispersion which is free from coagulate and forms a slightly sticky film has a viscosity of 4 poises. The particle size is about 0.5 micron.

Comparative experiment C

A mixture (free from styrene) of 250 parts of n-butyl acrylate and 250 parts of tertiary-butyl acrylate is used as the monomers in the procedure described in Example 7. A mobile, fine-particled dispersion is obtained having a particle size of about 0.1 micron. The dispersion contains much fine coagulate and is mechanically unstable.

EXAMPLE 8

One third of the following emulsifying liquor is placed in a reactor provided with a reflux condenser, stirrer and two feed vessels: 393 parts of water, 12.5 parts of the sodium salt of the sulfonation product of a nonylphenol which has been reacted with 9 moles of ethylene oxide, 7.5 parts of an adduct of 25 moles of ethylene oxide to 1 mole of n-octylphenol and 2.5 parts of an ethenoxylated polypropylene oxide having 40% by weight of ethylene oxide and a molecular weight of 3400. 2.5 parts of acrylic acid is added, the pH is adjusted to 9 with ammonia and the whole is heated to 80° C. A mixture of 150 parts of styrene, 350 parts of ethyl acrylate, 1.75 parts of methacrylamide and 1.5 parts of methyl vinyl carbinol is emulsified in the remaining liquor. This emulsion is allowed to flow into the reactor within two hours while stirring, simultaneously with a solution of 2.5 parts of potassium persulfate in 122 parts of water at 80° to 85° C. 25 parts of a 5% solution of hydroxyethyl cellulose having a K value of 90 is added to the final 380 parts of the monomer emulsion. 43% of the total amount of monomers has been polymerized by the time the addition of the protective colloid is begun. Polymerization is completed within two hours at 85° C.

The dispersion obtained has a viscosity of 12 poises and forms a clear, viscoelastic, glossy film.

EXAMPLE 9

The procedure of Example 8 is followed but a mixture of 450 parts of styrene and 50 parts of 2-ethylhexyl acrylate is used as the monomers and 5 parts of methacrylamide is added instead of 1.75 parts. The hydroxyethyl cellulose is added to the final 110 parts of the monomer emulsion, at a conversion of nearly 80%.

A creamy dispersion having a viscosity of 2.1 poises is obtained which, after a plasticizer has been added, forms a clear film at room temperature.

EXAMPLE 10

The procedure of Example 8 is followed but the following mixture is used as the monomers: 150 parts of methyl methacrylate, 100 parts of styrene and 250 parts of butyl acrylate. The hydroxyethyl cellulose is added to the final 145 parts, i.e. at 75% conversion.

The dispersion obtained has a viscosity of 8 poises and forms a clear glossy film.

EXAMPLE 11

The procedure of Example 8 is followed but using the following monomers: 200 parts of styrene, 100 parts of cyclohexyl acrylate and 200 parts of butyl acrylate. 2.5 parts of acrylamide is used instead of methacrylamide. A hydroxyethyl cellulose having a K value of 140 is used; it is introduced into the final 220 parts of the monomer emulsion at a conversion of 63%.

The viscosity of the dispersion obtained is 8 poises. It forms a high-gloss, non-tacky film.

EXAMPLE 12

A mixture of 200 parts of styrene and 300 parts of butyl methacrylate is polymerized as described in Example 8. The hydroxyethyl cellulose is added to the last 145 parts of monomer emulsion at a conversion of 79%.

The dispersion obtained has a viscosity of 3 poises and gives a clear film after a plasticizer has been added.

EXAMPLE 13

A mixture of 230 parts of styrene, 60 parts of butyl methacrylate and 230 parts of butyl acrylate is polymerized as described in Example 12. Conversion is about 80% at the commencement of the addition of the protective colloid.

A dispersion is obtained having a viscosity of 5 poises. It forms a tough, glossy film at room temperature.

We claim:
1. In a process for the production of an aqueous dispersion of a copolymer by polymerization of 5 to 95% by weight of styrene and 95 to 5% by weight of at least one monomer selected from the class consisting of esters of acrylic acid and methacrylic acid with alkanols containing one to eight carbon atoms or cycloalkanols having five to eight carbon atoms in the ring, said polymerization being conducted in aqueous emulsion, the improvement comprising gradually adding during the polymerization, after a conversion of 20 to 80% of the whole of the monomers, about 0.01 to 2% by weight of a protective colloid, the percentages by weight being on the weight of the monomers.

2. A process as claimed in claim 1 wherein there is further copolymerized 0.05 to 5% by weight, based on the amount of monomers, of at least one other ethylenically unsaturated monomer selected from the class consisting of a carboxylic acid having three to five carbon atoms, an amide thereof and vinylsulfonic acid.

3. A process as claimed in claim 1 wherein the polymerization is carried out while adding 0.05 to 1% by weight of polyvinyl methyl ether.

4. A process as claimed in claim 2 wherein the polymerization is carried out while adding 0.05 to 1% by weight of polyvinyl methyl ether.

5. A process as claimed in claim 1 wherein there is copolymerized about 10 to 65% by weight of said styrene and about 35 to 90% by weight of at least one of said esters of acrylic acid or methacrylic acid.

6. A process as claimed in claim 5 wherein there is further polymerized 0.05 to 5% by weight, based on the amount of monomers, of at least one other ethylenically unsaturated monomer selected from the class consisting of a carboxylic acid having three to five carbon atoms, an amide thereof and vinylsulfonic acid.

7. A process as claimed in claim 5 wherein the polymerization is carried out while adding 0.05 to 1% of polyvinyl methyl ether.

8. A process as claimed in claim 1 wherein said aqueous emulsion for said polymerization is achieved by the addition of at least one emulsifier selected from the class consisting of anion-active and nonionic emulsifiers.

9. A process as claimed in claim 1 wherein styrene is copolymerized with butyl acrylate.

10. A process as claimed in claim 1 wherein styrene is copolymerized with ethyl acrylate.

11. A process as claimed in claim 1 wherein styrene is copolymerized with 2-ethylhexyl acrylate.

References Cited

UNITED STATES PATENTS

| | | |
|---|---|---|
| 2,886,552 | 5/1959 | Heiligmann et al. |
| 3,186,975 | 6/1965 | Harris _____ 260—86.7 |
| 3,222,343 | 12/1965 | Ingram et al. |
| 3,242,121 | 3/1966 | Hill. |
| 2,998,400 | 8/1961 | French. |
| 3,095,398 | 6/1963 | Howland et al. |

FOREIGN PATENTS 856,337  12/1960  Great Britain.

SAMUEL H. BLECH, Primary Examiner

W. J. BRIGGS, Sr., Assistant Examiner

U.S. Cl. X.R.

260—17, 80.73, 80.8, 80.81, 79.7, 875, 885, 886